United States Patent
Sekiguchi

(10) Patent No.: US 11,207,853 B2
(45) Date of Patent: Dec. 28, 2021

(54) FLAT TIRE REPAIR KIT

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 225 days.

(21) Appl. No.: 16/081,874

(22) PCT Filed: Mar. 6, 2017

(86) PCT No.: PCT/JP2017/008823
§ 371 (c)(1),
(2) Date: Aug. 31, 2018

(87) PCT Pub. No.: WO2017/169538
PCT Pub. Date: Oct. 5, 2017

(65) Prior Publication Data
US 2020/0180247 A1    Jun. 11, 2020

(30) Foreign Application Priority Data

Mar. 28, 2016 (JP) .............................. JP2016-064345

(51) Int. Cl.
*B29C 73/16* (2006.01)
*B65D 83/14* (2006.01)

(52) U.S. Cl.
CPC .......... *B29C 73/166* (2013.01); *B65D 83/756* (2013.01)

(58) Field of Classification Search
CPC ............................ B29C 73/166; B65D 83/756
USPC .............. 141/38, 383, 330, 382, 41; 222/81; 439/528
See application file for complete search history.

(56) References Cited

U.S. PATENT DOCUMENTS

| 2011/0192492 | A1 | 8/2011 | Kanenari et al. |
| 2011/0290372 | A1* | 12/2011 | Dowel ................. B29C 73/166 141/37 |
| 2013/0284313 | A1* | 10/2013 | Kojima ............... F04B 39/0055 141/38 |
| 2015/0059920 | A1* | 3/2015 | Takahara .............. B29C 73/025 141/5 |

(Continued)

FOREIGN PATENT DOCUMENTS

| EP | 1358996 A1 * | 11/2003 | .......... B60C 29/062 |
| JP | 2010-120250 | 6/2010 | |
| JP | 2013-220622 | 10/2013 | |

(Continued)

OTHER PUBLICATIONS

EP1358996A1—English Translation (Year: 2002).*
International Search Report for International Application No. PCT/JP2017/008823 dated May 16, 2017, 2 pages, Japan.

*Primary Examiner* — Timothy P. Kelly
*Assistant Examiner* — Christopher M Afful
(74) *Attorney, Agent, or Firm* — Thorpe North & Western

(57) ABSTRACT

A puncture repair kit includes a container configured to house puncture repair liquid; a hose configured to be connected to the container and carry the puncture repair liquid into a tire; a compressor configured to supply compressed air for supplying under pressure the puncture repair liquid in the container through the hose; and an assistor configured to correct a tilt of the container when the container is connected to a tire valve via the hose and pendent from the tire valve.

11 Claims, 9 Drawing Sheets

(56) References Cited

U.S. PATENT DOCUMENTS

2016/0136906 A1* 5/2016 Chou .................... B29C 73/166
                                                         141/38

FOREIGN PATENT DOCUMENTS

| WO | WO 2010/047231 | 4/2010 |
| WO | WO 2013/157469 | 10/2013 |

* cited by examiner

FLAT TIRE REPAIR KIT

TECHNICAL FIELD

The present technology relates to a puncture repair kit including a container, a hose, and a compressor and particularly relates to a puncture repair liquid holding container that can provide reliable discharge of a puncture repair liquid in the container by correcting the tilt of the container pendent from a tire valve via a hose while in use.

BACKGROUND ART

In recent years, when a tire mounted to a vehicle is punctured, a puncture repair liquid is injected into the tire via the tire valve to temporarily repair the puncture. An example of a device that enables such a temporary repair include a puncture repair kit. Employing a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

A known puncture repair kit, for example, includes a container configured to contain a puncture repair liquid, a hose configured to be connected to the container and carry the puncture repair liquid into the tire, and a compressor configured to supply compressed air for supplying under pressure the puncture repair liquid in the container through the hose (for example, see Japan Unexamined Patent Publication No. 2013-220622). To achieve a reduction in weight and reduce costs of such a puncture repair kit, the hose may be shortened. However, depending on the position of the tire valve when the tire is repaired using the puncture repair kit, shortening the hose results in the container being held pendent from the tire valve via the hose. The pendent container tilting may cause the puncture repair liquid in the container to not be sufficiently discharged, and thus the puncture may not be appropriately repaired. Accordingly, there is a demand for technology for reliably discharging a puncture repair liquid in a container by correcting the tilt of the container that is held pendent from a tire valve by a hose.

SUMMARY

The present technology provides a puncture repair liquid holding container that can provide reliable discharge of a puncture repair liquid in the container by correcting the tilt of the container held pendent from a tire valve via a hose while in use.

A puncture repair kit according to an embodiment of the present technology includes a container configured to house puncture repair liquid; a hose configured to be connected to the container and carry the puncture repair liquid into a tire; a compressor configured to supply compressed air for supplying under pressure the puncture repair liquid in the container through the hose; and an assistor configured to correct a tilt of the container when the container is connected to a tire valve via the hose and pendent from the tire valve.

In an embodiment of the present technology, by providing the assistor in this manner, the tilt of the container can be corrected when the container is connected to and held pendent from the tire valve via the hose. Accordingly, the puncture repair liquid in the container can be reliably discharged.

In an embodiment of the present technology, the assistor may include a contact portion configured to contact a portion of a tire-wheel assembly and a holding portion configured to hold the container and be configured to correct a tilt of the container by being inserted between the tire-wheel assembly and the container. With this configuration, the tilt of the container can be corrected with a simple structure including the contact portion and the holding portion and without using a member with a complex structure for the assistor.

In this embodiment, a plurality of pairs of the contact portion and the holding portion may be disposed at positions opposite one another on the assistor; and a distance from the holding portion to the contact portion may be different among the plurality of pairs. With this configuration, even in a case where the tire-wheel assembly that the assistor comes into contact with changes depending on the position of the tire valve, the tilt of the container can be corrected by changing the orientation of the assistor and using the pair with a suitable distance from the holding portion to the contact portion.

In an embodiment of the present technology, the assistor includes a reel portion on which a power cable of the compressor is wound. With this configuration, a housing portion configured to house the power cable is not required to be provided on the compressor, thus the compressor can be made more compact. Additionally, good workability when using the puncture repair kit (workability when drawing out or returning the power cable) can be achieved.

In this embodiment, the assistor may include a holder configured to hold a socket for the power cable. With this configuration, good workability when using the puncture repair kit (workability when using the power cable) can be achieved.

In an embodiment of the present technology, the compressor may include a projection portion or a receiving hole on a back surface of the compressor, and the assistor may include a receiving hole or a projection portion configured to engage with the projection portion or the receiving hole of the compressor. With this configuration, the assistor can be fixed to the compressor for storage and the like. Thus, the puncture repair kit can be made compact, and the storability can be increased.

DETAILED DESCRIPTION

Configuration of embodiments of the present technology is described in detail below with reference to the accompanying drawings.

Figure 1:
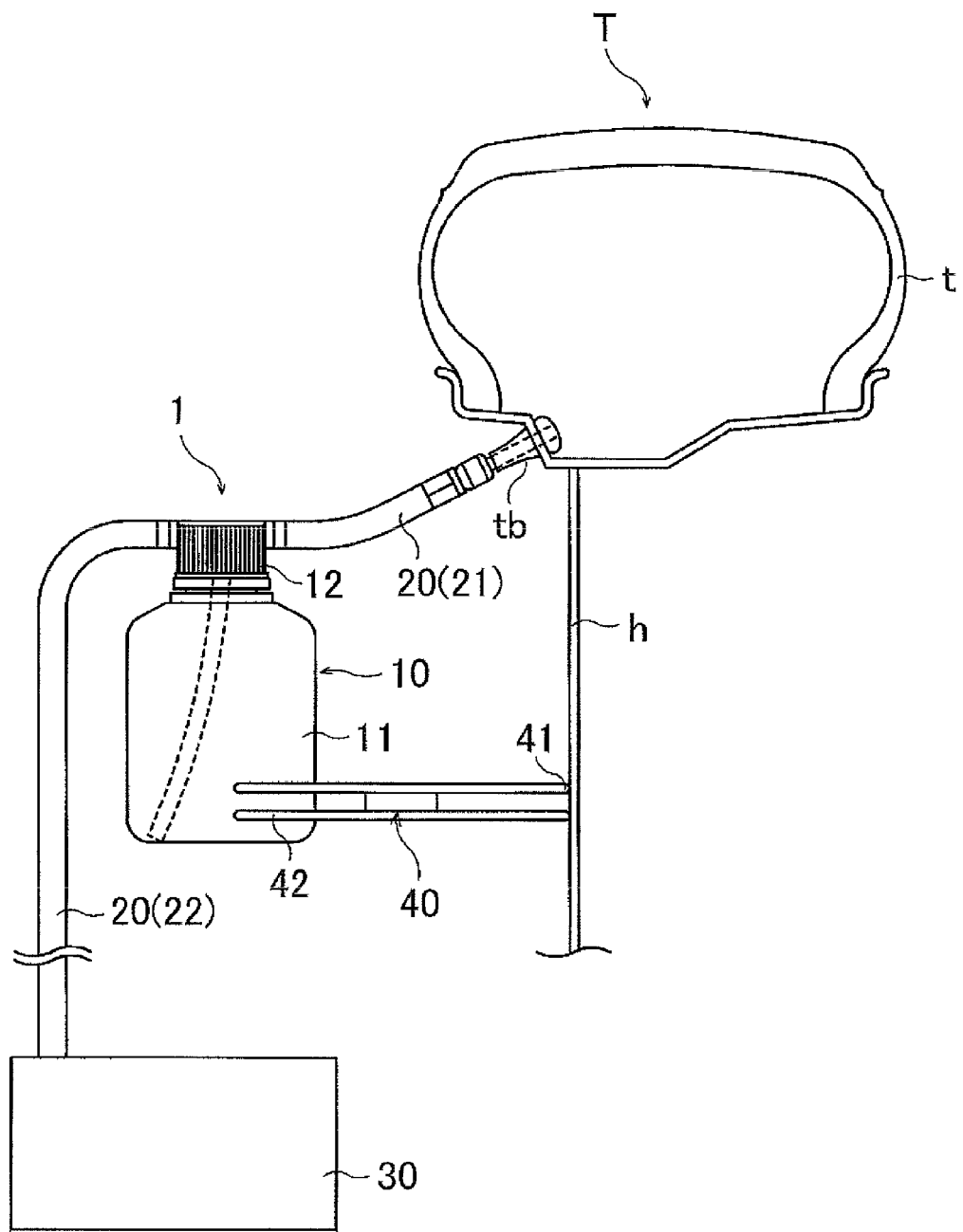
FIG. 1 is an explanatory diagram illustrating an example of a puncture repair kit of an embodiment of the present technology.

As illustrated in FIG. 1, a puncture repair kit 1 of an embodiment of the present technology includes a container 10, a hose 20, a compressor 30, and an assistor 40. Note that in FIG. 1, reference sign t denotes a tire, reference sign h denotes a wheel, reference sign tb denotes a tire valve, and reference sign T denotes a tire-wheel assembly that encompasses the tire t and the wheel h (encompasses the wheel h and the tire t mounted thereon).

The assistor 40 described below is configured to correct the tilt of the container 10, and in the present technology, the structure of the container 10, the hose 20, and the compressor 30 is not particularly limited. A typical puncture repair kit can be used as the puncture repair kit 1. Note that in the example of FIG. 1, the container 10 includes a cylindrical container main body 11 configured to contain puncture repair liquid therein and a cap 12 configured to be mounted on the container main body 11 and connectable to the hose 20 described below. The hose 20 includes a hose 21 configured to connect the container 10 and the tire t (tire valve tb) and a hose 22 configured to connect the container 10 and the compressor 30. In the puncture repair kit 1 according to an embodiment of the present technology, the length of the hose 21 is shortened to from 50 mm to 100 mm to reduce weight. As a result, when the container 10 is connected to the tire valve tb via the hose 21, the container 10 is held pendent from the tire valve tb as illustrated. The compressor 30 is configured to supply compressed air to supply under pressure the puncture repair liquid into the container 10 via the hose 20 and may include a housing in which a power supply, a pump, and other constituents are housed.

The assistor 40 is configured to correct the tilt of the container 10 pendent from the tire valve tb. For example, as illustrated in FIG. 1, the assistor 40 includes a contact portion 41 configured to contact a portion of the tire-wheel assembly T and a holding portion 42 configured to hold the container 10 and is configured to correct the tilt of the container 10 by being inserted between the tire-wheel assembly T and the container 10. By using the assistor 40 in this manner, the tilt of the container 10 can be corrected when the container 10 is connected to and held pendent from the tire valve tb via the hose 20. Accordingly, the puncture repair liquid in the container 10 can be reliably discharged.

Figure 2:
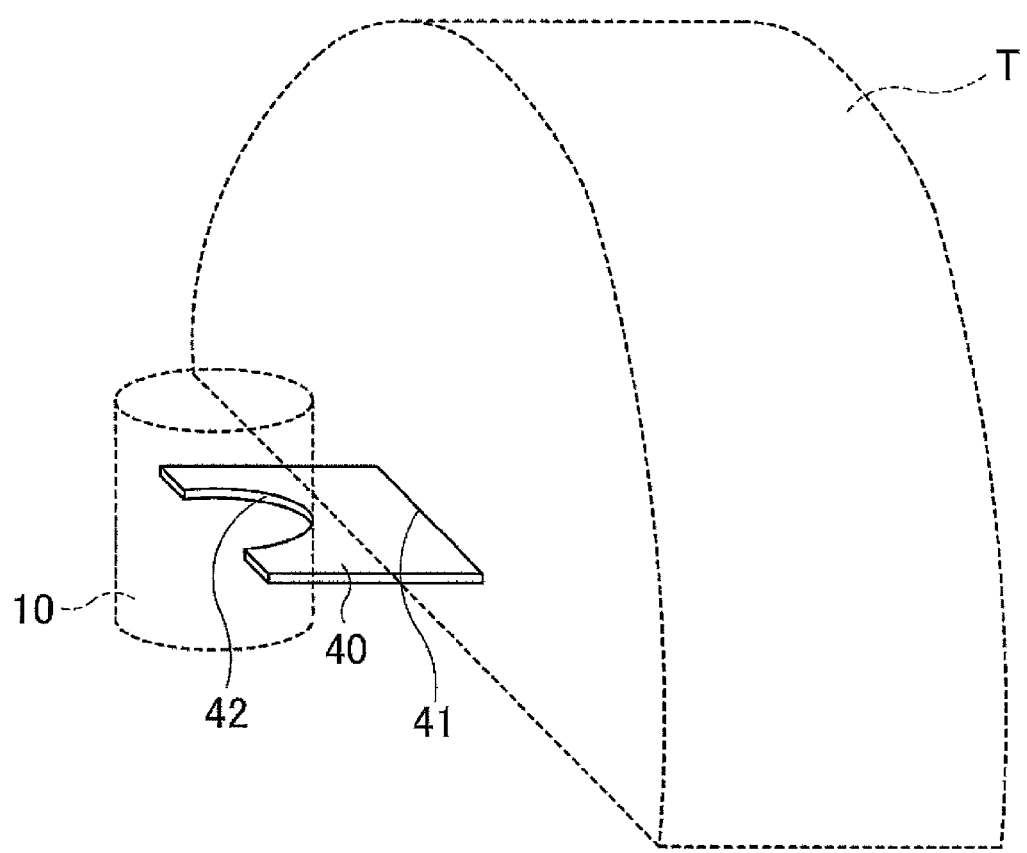
FIG. 2 is an explanatory diagram schematically illustrating an assistor of an embodiment of the present technology.
Figure 3:
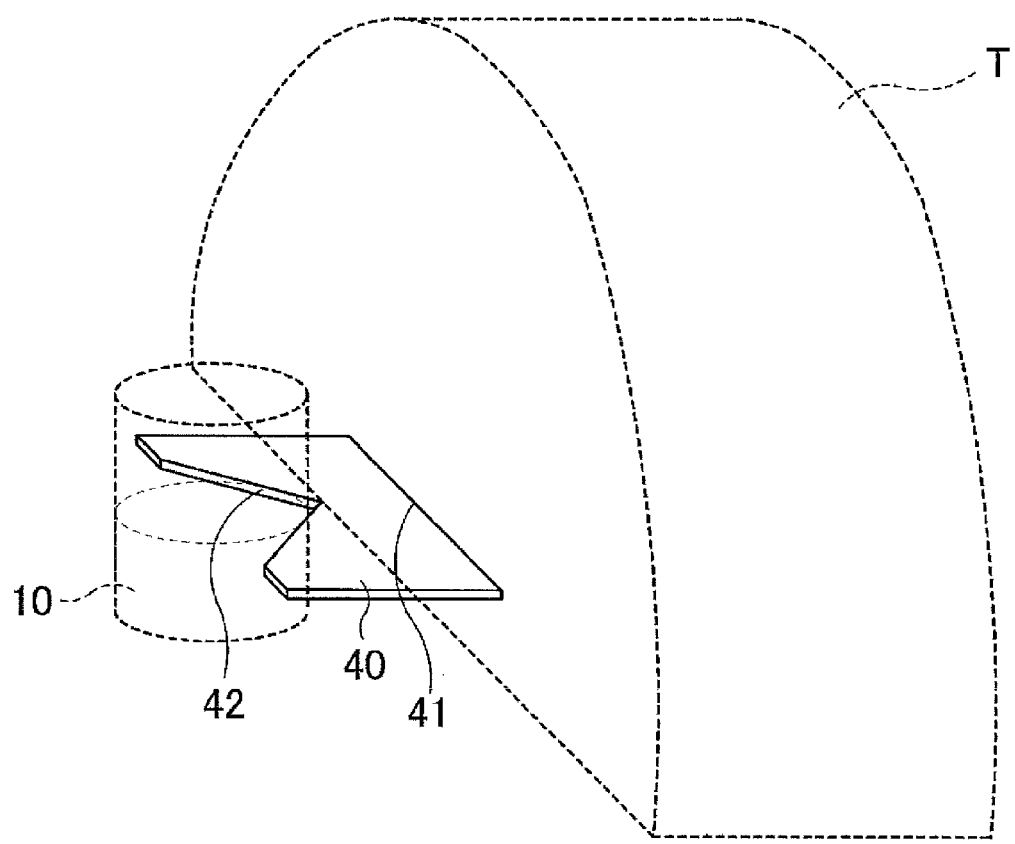
FIG. 3 is an explanatory diagram schematically illustrating an assistor of another embodiment of the present technology.
Figure 4:
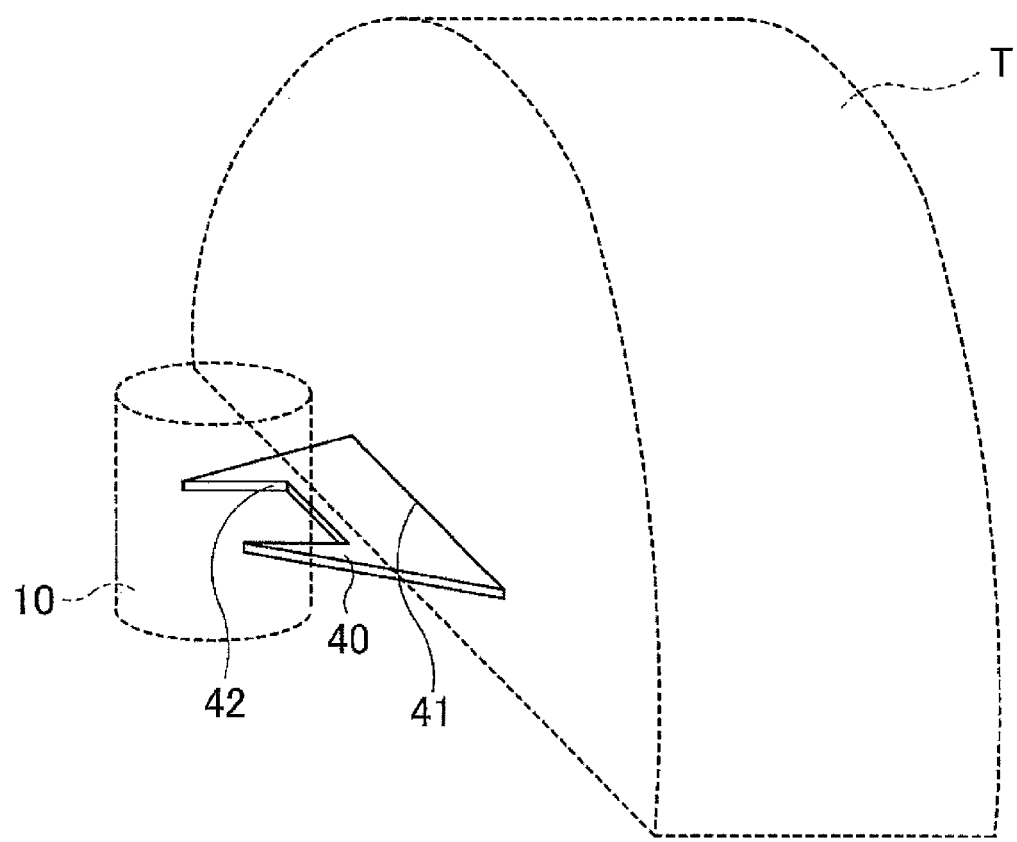
FIG. 4 is an explanatory diagram schematically illustrating an assistor of another embodiment of the present technology.
Figure 5:
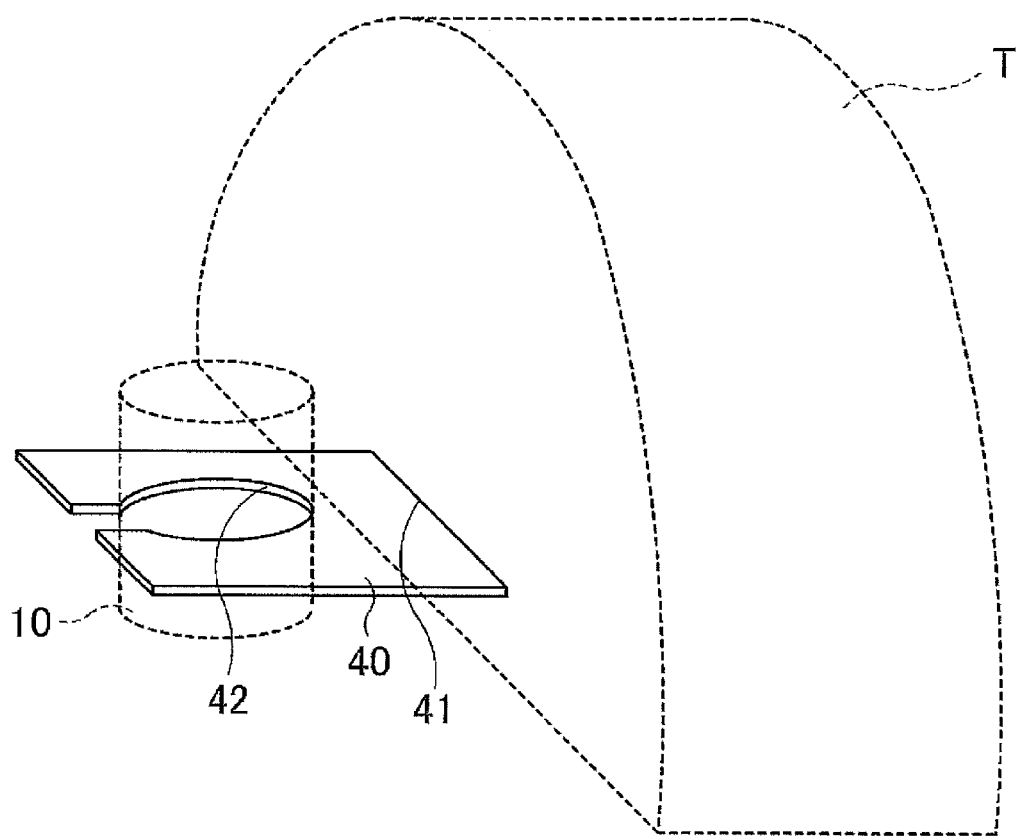
FIG. 5 is an explanatory diagram schematically illustrating an assistor of another embodiment of the present technology.

The holding portion 42 of the assistor 40 configured to hold the container 10 is not particularly limited in shape and any form such as those illustrated in FIGS. 2 to 5 can be employed. In the example of FIG. 2, a substantially semicircular holding portion 42 is provided at one end of the plate-like assistor 40, and the contact portion 41 is provided at the opposite end. In the example of FIG. 3, a substantially triangular holding portion 42 is provided at one end of the plate-like assistor 40, and the contact portion 41 is provided at the opposite end. In the example of FIG. 4, a substantially quadrangular holding portion 42 is provided at one end of the plate-like assistor 40, and the contact portion 41 is provided at the opposite end. In the example of FIG. 5, the holding portion 42 is a hole provided in a portion of the plate-like assistor 40, and the container 10 is held by being inserted in this hole. In such a configuration, the four sides (edge portions) of the plate-like assistor 40 correspond to the contact portion 41. In a configuration such as that illustrated in FIG. 5 in which the holding portion 42 is a hole, a cut connecting to the holding portion 42 may be provided as illustrated. Alternatively, instead of providing a recess or hole with a shape formed to receive the container 10 as illustrated in FIGS. 2 to 5, as the holding portion 42, a double-sided tape configured to adhere the container 10 to the assistor 40 may be provided or a surface fastener in the assistor 40 and the container 10 may be provided.

The shape of the assistor 40 is not limited to the rectangular shapes of the examples of FIGS. 2, 3, and 5 or the substantially trapezoidal shape of the example of FIG. 4, and various shapes can be employed. In FIGS. 2 to 5, a plate-like assistor 40 is illustrated. However, any assistor 40, for example, a rod-like assistor 40, can be employed that can correct the tilt of the container 10 by being interposed between the tire-wheel assembly T and the container 10 as described above. Additionally, to increase the storability of the assistor 40 in times of storage, the assistor 40 may have a foldable structure. The size of the assistor 40 is not particularly limited, but the assistor 40 preferably has dimensions similar to that of the container 10 so that it can hold the container 10 stably.

The material of the assistor 40 is not particularly limited, and materials such as plastic and resin with strength great enough to be able to support the weight of the container 10 filled with the puncture repair liquid and excellent workability can be used. Additionally, a corrugated cardboard box or the like that houses the entire puncture repair kit 1 may function as the assistor 40 (include the contact portion 41 and the holding portion 42), with the puncture repair kit 1 working as the assistor 40 after being taken out of the box.

Figure 6:
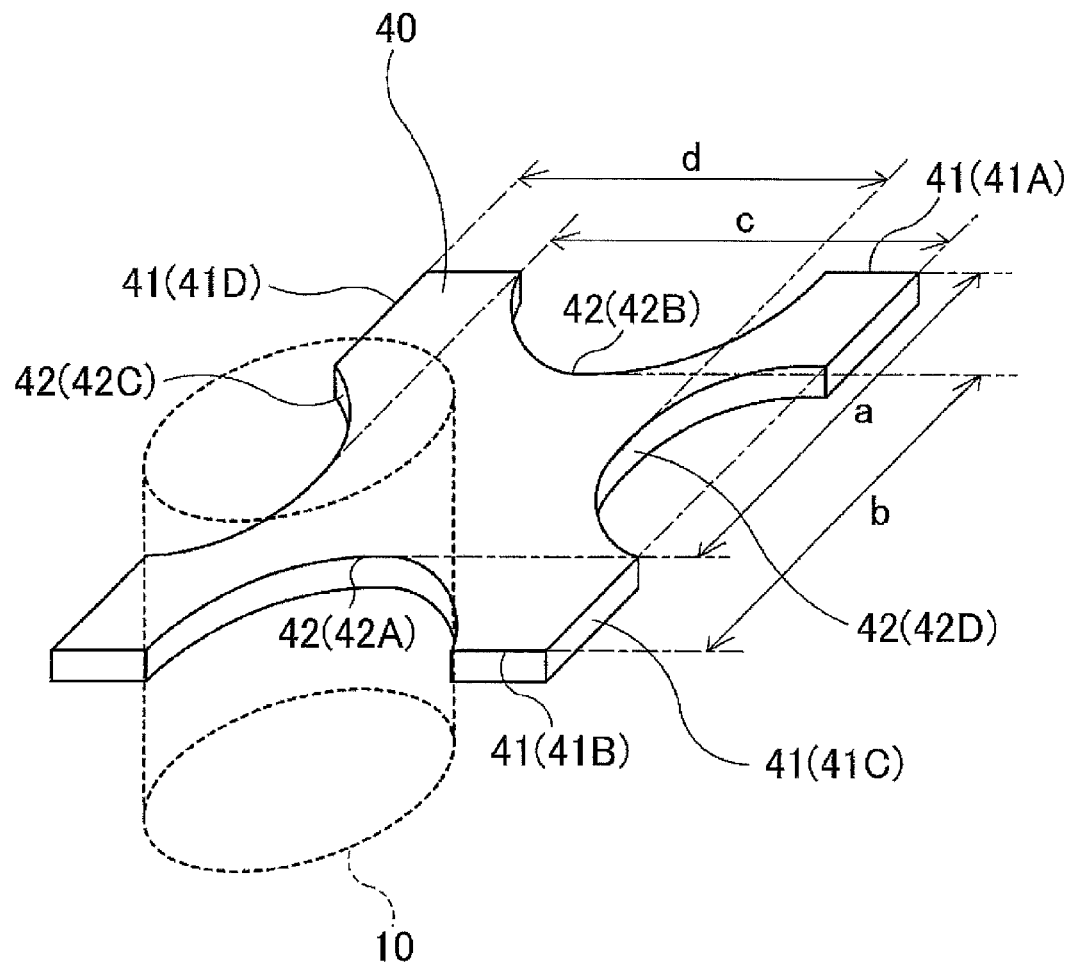
FIG. 6 is an explanatory diagram schematically illustrating an assistor of another embodiment of the present technology.

In the examples of FIGS. 2 to 4, the assistor 40 includes one contact portion 41 and one holding portion 42. However, as illustrated in FIG. 6, the assistor 40 may include a plurality of pairs of the contact portion 41 and the holding portion 42 disposed at opposite positions. In the example of FIG. 6, the plate-like assistor 40 is provided with semicircular, recess-like holding portions 42 in the middle of each side, and the portions where the holding portions 42 on each side are not disposed corresponds to the contact portions 41. Thus, the assistor 40 includes pairs of the contact portion 41 and the holding portion 42 located opposite each other. For example, when the container 10 is held at the position illustrated by the dashed lines in FIG. 6, the side opposite this holding portion 42A corresponds to a contact portion 41A, and this holding portion 42A and this contact portion 41A are a pair. Here, the distance from the holding portion 42 to the contact portion 41 is preferably different among the plurality of pairs. Specifically, a distance a from the holding portion 42A configured to hold the container 10 illustrated by the dashed lines in the drawing to the contact portion 41A disposed at a position opposite the holding portion 42A, a distance b from a holding portion 42B provided on the side opposite the holding portion 42A configured to hold the container 10 illustrated by dashed lines in the drawing to a contact portion 41B disposed at a position opposite the holding portion 42B, and distances c, d from the contact portion 41 to the holding portion 42 of pairs of contact portions 41C, 41D and holding portions 42C, 42D opposite one another in a direction intersecting the direction of the other pairs are different from one another. By the contact portions 41 and the holding portions 42 having such a configuration, even in a case where the way the container 10 tilts changes or the position of the tire-wheel assembly T that the assistor 40 comes into contact with changes depending on the position of the tire valve tb, the tilt of the container 10 can be appropriately corrected by changing the orientation of the assistor 40 and selecting the pair suitable for correcting the tilt of the container 10. For example, in the example of FIG. 6, four different distances a to d can be selected by changing the orientation of the assistor 40.

Figure 7:
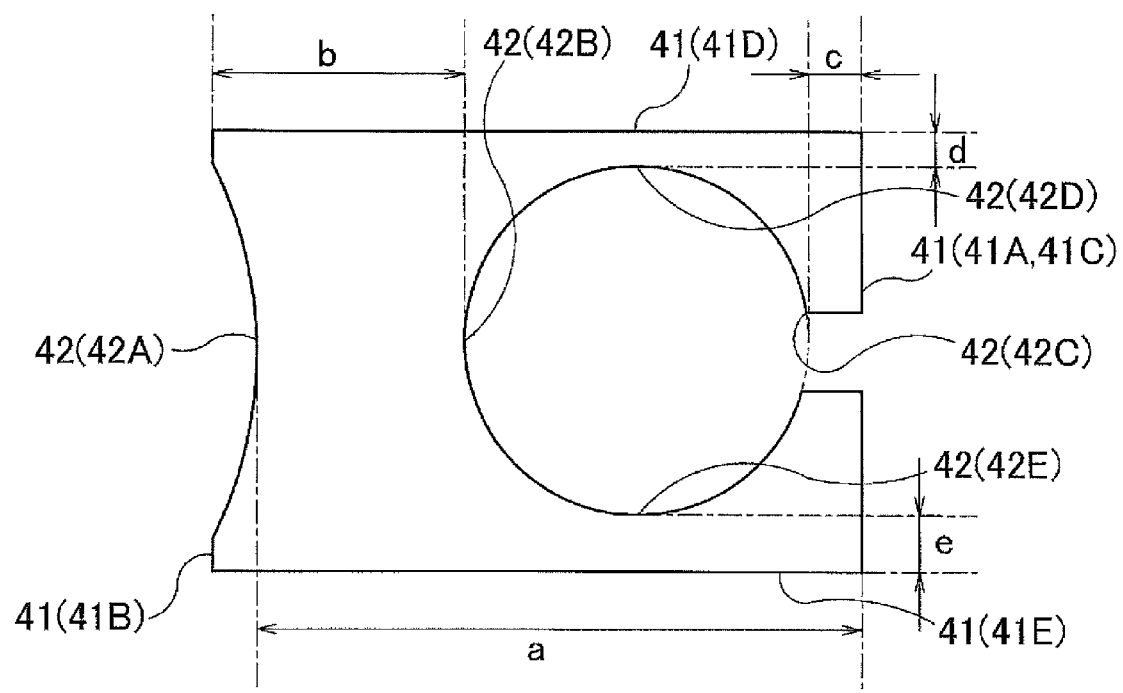
FIG. 7 is an explanatory diagram schematically illustrating an assistor of another embodiment of the present technology.

In an example such as that illustrated in FIG. 5 in which the holding portion 42 is a hole provided in a portion of the assistor 40, the position of the hole can be offset from the center of the assistor 40 as illustrated in FIG. 7, and another holding portion 42 with a recess-like shape can be provided on the edge portion of the assistor 40. This allows a plurality of pairs of the contact portion 41 and the holding portion 42 to be provided at different distances. In the example of FIG. 7, the pair of the contact portion 41A and the holding portion 42A, the pair of the contact portion 41B and the holding portion 42B, the pair of the contact portion 41C and the holding portion 42C, the pair of the contact portion 41D and the holding portion 42D, and the pair of a contact portion 41E and a holding portion 42E are formed. Thus, five different distances a to e from the contact portions 41 to the holding portions 42 can be selected by changing the orientation of the assistor 40.

Figure 8:
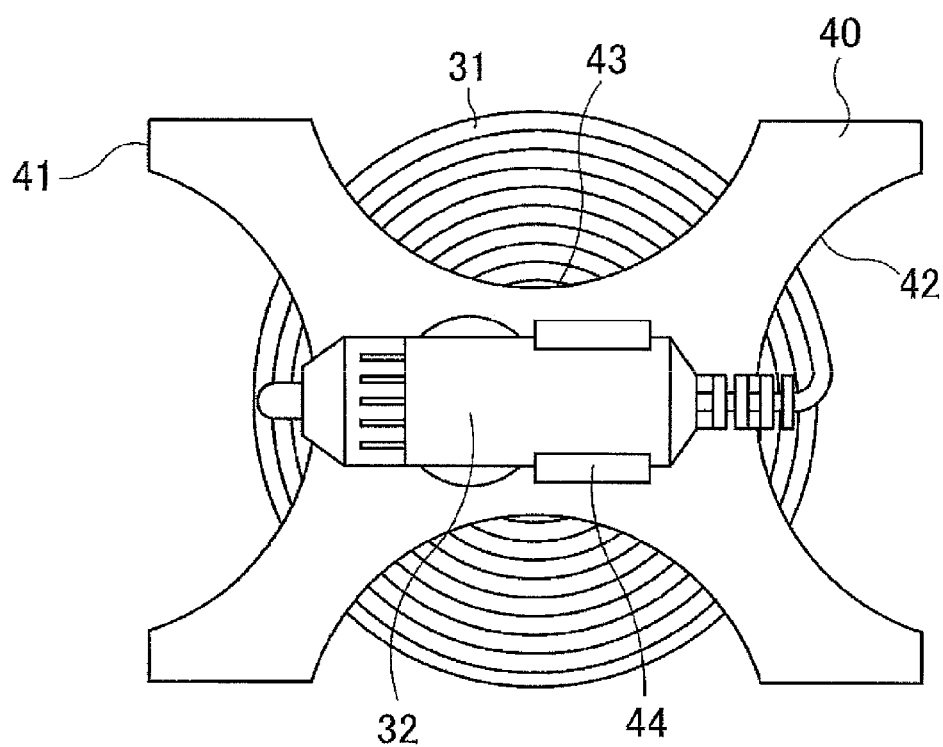
FIG. 8 is an explanatory diagram illustrating an enlarged portion of a puncture repair kit of another embodiment of the present technology.
Figure 9:
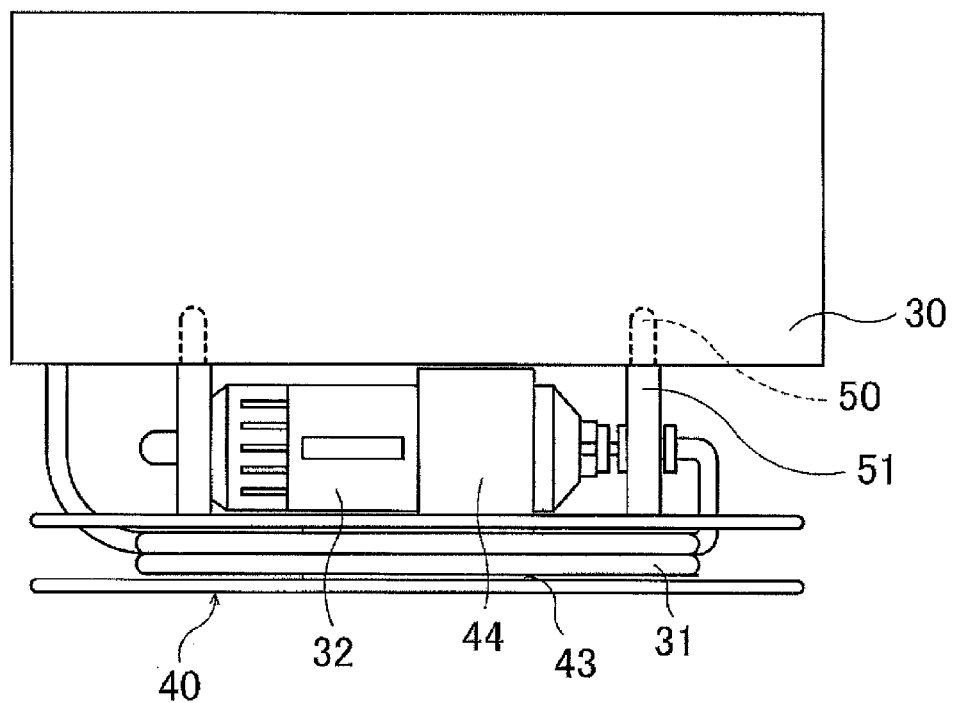
FIG. 9 is an explanatory diagram illustrating an enlarged portion of a puncture repair kit of another embodiment of the present technology.

It is sufficient that the assistor 40 can correct the tilt of the container 10 as described above. However, as illustrated in FIGS. 8 and 9, a reel portion 43 on which a power cable 31 of a compressor 30 can be wound can be provided to also give the assistor 40 the function of a reel for the power cable 31. Note that in the example of FIGS. 8 and 9, the reel portion 43 and a holder 44 are provided, the holder 44 being configured to hold a socket 32 for the power cable 31 of the compressor 30. In this way, a housing portion configured to house the power cable 31 is not required to be provided in the housing of the compressor 30, thus the compressor 30 can be made more compact. Additionally, good workability when using the puncture repair kit 1 (workability when using the power cable and the socket) can be achieved.

In an embodiment of the present technology, the assistor 40 is added to a typical puncture repair kit 1. Thus, the assistor 40 preferably has high storability. Here, as illustrated in FIG. 9, by providing a receiving hole 50 in the back surface of the compressor 30 and a projection portion 51 on the assistor 40 that is capable of engaging the receiving hole 50 on the compressor 30 side, the assistor 40 can be fixed to the compressor 30 for storage via the receiving hole 50 and the projection portion 51. In this way, the entire puncture repair kit 1 can be made compact, and the storability can be increased. Note that it is sufficient that the compressor 30 and the assistor 40 can engage with one another, and a configuration opposite to that of the example of FIG. 9 with the projection portion 51 on the compressor 30 side and the receiving hole 50 on the assistor 40 side can be employed.

The invention claimed is:

1. A puncture repair kit, comprising:
   a container configured to house puncture repair liquid;
   a hose configured to be connected to the container and carry the puncture repair liquid into a tire;
   a compressor configured to supply compressed air for supplying under pressure the puncture repair liquid in the container through the hose; and
   an assistor configured to correct a tilt of the container by contacting the container only on a container side at a position spaced away from a neck portion of the container when the container is connected to a tire valve via the hose and hanging from the tire valve; wherein
   the assistor comprises a recessed portion recessed from an outer side of the assistor configured to receive and contact the container side to correct the tilt of the container, the outer side of the assistor extending along a length or width of the assistor perpendicular to a longitudinal axis of the container when the assistor corrects the tilt of the container, and the recessed portion is configured to circumscribe less than an entirety of a circumference of the container.

2. The puncture repair kit according to claim 1, wherein the assistor comprises a contact portion configured to contact a portion of a tire-wheel assembly and a holding portion configured to hold the container and is configured to correct a tilt of the container by being inserted between the tire-wheel assembly and the container.

3. The puncture repair kit according to claim 2, wherein a plurality of pairs of the contact portion and the holding portion are disposed at positions opposite one another on the assistor; and
a distance from the holding portion to the contact portion is different among the plurality of pairs.

4. The puncture repair kit according to claim 1, wherein the assistor comprises a reel portion on which a power cable of the compressor is wound.

5. The puncture repair kit according to claim 4, wherein the assistor comprises a holder configured to hold a socket for the power cable.

6. The puncture repair kit according to claim 1, wherein the compressor comprises a projection portion or a receiving hole on a back surface of the compressor, and the assistor comprises a receiving hole or a projection portion configured to engage with the projection portion or the receiving hole of the compressor.

7. The puncture repair kit according to claim 3, wherein the assistor comprises a reel portion on which a power cable of the compressor is wound.

8. The puncture repair kit according to claim 7, wherein the assistor comprises a holder configured to hold a socket for the power cable.

9. The puncture repair kit according to claim 8, wherein the compressor comprises a projection portion or a receiving hole on a back surface of the compressor, and the assistor comprises a receiving hole or a projection portion configured to engage with the projection portion or the receiving hole of the compressor.

10. The puncture repair kit according to claim 4, wherein the assistor comprises two plates with the reel portion disposed between the two plates.

11. The puncture repair kit according to claim 9, wherein the holder is outside of the reel portion, and the holder projects from a same side of the assistor as the projection portion to hold the socket between the assistor and the compressor.

\* \* \* \* \*